United States Patent [19]

Pan et al.

[11] Patent Number: 4,628,181
[45] Date of Patent: Dec. 9, 1986

[54] METHOD OF CONTROLLING THE OUTPUT CHARACTERISTIC OF A WELDING POWER SOURCE, APPARATUS FOR ARC WELDING, AND ELECTRICAL CIRCUIT TO BE USED FOR SUCH APPARATUS

[76] Inventors: Jiluan Pan; Renhao Zhang; Zhiming Ou; Zhiqion Wu, all of Tsinghua Yuan, Beijing, China

[21] Appl. No.: 709,388

[22] Filed: Mar. 7, 1985

[30] Foreign Application Priority Data

Jul. 5, 1984 [EP] European Pat. Off. ........ 84107840.5

[51] Int. Cl.⁴ ................................................ B23K 9/09
[52] U.S. Cl. ........................... 219/130.33; 219/130.51; 219/137 PS
[58] Field of Search ...................... 219/130.33, 137 PS, 219/130.51, 130.21, 124.03

[56] References Cited

U.S. PATENT DOCUMENTS

| | | | |
|---|---|---|---|
| 2,458,658 | 1/1949 | Tyrner | 219/130.33 |
| 3,026,407 | 3/1962 | Bergmann | 219/130.33 |
| 3,058,047 | 10/1962 | Tajbl | 219/130.33 |
| 3,538,299 | 11/1970 | Daggett | 219/124.03 |
| 3,906,184 | 9/1975 | Gibbs et al. | 219/130.21 |
| 4,283,617 | 8/1981 | Merrick et al. | 219/125.1 |
| 4,283,618 | 8/1981 | Jakob | 219/130.5 |
| 4,384,188 | 5/1983 | Wright, Jr. | 219/130.51 |
| 4,409,465 | 10/1983 | Yamamoto et al. | 219/130.51 |
| 4,438,318 | 3/1984 | Suzuki | 219/137 PS |
| 4,441,009 | 4/1984 | Toohey | 219/124.03 |
| 4,497,997 | 2/1985 | Bodewig | 219/130.51 |
| 4,523,077 | 6/1985 | Hoyt, Jr. et al. | 219/137 PS |

FOREIGN PATENT DOCUMENTS 81105288.5 of 1981 European Pat. Off.
59-73180 4/1984 Japan .............................. 219/130.51

OTHER PUBLICATIONS

Metals Handbook, 9th Ed. vol. 6 Brazing Welding and Soldering, pp. 153-181.
Barton B. F., Notes for Electronics Laboratory revised Aug. 20, 1975.
Amin, M., "Synergic Pulse MIG Welding, *Welding Construction*, Jun. 1981.

*Primary Examiner*—Clifford C. Shaw
*Attorney, Agent, or Firm*—Robert M. Isackson; Donald E. Degling; David W. Plant

[57] ABSTRACT

A method and apparatus for arc welding particularly regarding a pulse arc welding machine comprising a welding power source having an output characteristic control circuit, an overload protection circuit, a driving circuit, and a main power circuit, and a wire feeding unit having a wire feeding control circuit, a motor driving circuit and a wire feed motor. The output characteristic control circuit comprises a welding arc autoregulating control system which provides the power source with a multi-segmental and moving output characteristic with varying slope, a circuit for connecting arbitrary number of output characteristic segments with arbitrary or varying slope, and a scanning circuit for obtaining the output characteristic segment with varying slope. A particular use of the control system is in an easy to operate autoregulating controlled GMA welding machine with one-knob control of wire feed rate without having to adjust the other welding parameters.

16 Claims, 9 Drawing Figures

METHOD OF CONTROLLING THE OUTPUT CHARACTERISTIC OF A WELDING POWER SOURCE, APPARATUS FOR ARC WELDING, AND ELECTRICAL CIRCUIT TO BE USED FOR SUCH APPARATUS

This invention relates to controlled gas metal arc welding machines, and specifically to a method and apparatus having an improved power supply with a multi-segmental output characteristic.

BACKGROUND OF THE INVENTION

Gas Metal Arc ("GMA") welding is a welding process that produces coalescence of metals by heating them with an arc current passed across a gap between a consumable filler metal electrode and a workpiece. Gas shielding is provided by an externally supplied inert gas or gas mixture to prevent contamination of the coalescing metals during welding.

Pulsed GMA welding is one form of GMA welding which uses a pulsed arc current waveform having a background arc current component and a pulse arc current component. The background current maintains a minimum arc current and preheats and conditions the electrode wire for subsequent melting. The background current must not be so high as to cause arc burnback. The pulse current component, having a larger amplitude than the background current, heats the electrode to a temperature above its melting point, causes spray metal transfer to occur, and increases the distance of the gap. Spray metal transfer involves the movement of molten filler metal of the consumable electrode, under electrostatic forces, from the end of the electrode wire in an axial stream of fine droplets across the air gap between the end of the electrode and the work piece. The droplets typically have a diameter less than that of the electrode wire. Pused GMA welding typically uses an argon or argon-rich mixture to envelope the electrode and workpiece about the air gap.

As spray transfer occurs, the end of the electrode wire nearest the workpiece retreats from the workpiece and increases the air gap or arc length. Because the electrode wire is typically advanced at either a relatively constant rate or at a pulsed rate, the arc length can vary within a given range by careful selection of four welding current characteristics—amplitude and duration of the background current, and the amplitude and duration of the pulse current—and a wire feed rate so that the filler metal of the electrode wire will be melted or burned off and transferred to the work piece at a rate that will keep the end of the electrode wire at or within a given distance from the work piece. The melting must occur within the desired arc length range to provide acceptable spray metal transfer. If melting occurs outside the desired range, the metal transfer may be globular or a short circuit drop deposit, or no metal transfer will occur at all, resulting in irregular and unacceptable weld deposits on the work piece. The burn-off is accomplished by changes in the arc current intensity as the wire moves and the arc length and arc voltage change. GMA welding has been previously defined in Metals Handbook, Ninth Edition, Volume 6 "Welding, Brazing and Soldering", pages 153–181, American Society For Metals (1983).

Conventional GMA welding machines comprise a power supply sufficient to generate an arc current, a wire feeder to advance the electrode wire as it is melted, a flow of shielding gas, and a welding device or gun that carries the current, electrode wire, shielding gas, and, if necessary, cooling water. Conventional welding guns and shielding gas flows are known to those skilled in the art and do not form a part of this invention.

Power supplies used in arc welding machines are desired to be autoregulating so as to provide as much current as is needed to maintain a stable arc length and spray metal transfer as the electrode wire advances and the instantaneous arc length changes. The current characteristics for the particular electrode wire must take into account the size, mass, and composition of the filler metal electrode and must be selected so that the wire will be alternatively preheated and then melted. The selection of the electrode wire and the welding conditions must also take into amount the mass and composition of the workpiece, and the nature of the desired weld.

The arc voltage is the voltage drop across the arc length or air gap, and its magnitude is related to the size of the arc length. The relationship between the output voltage of the power supply and the output current delivered to the electrode, the arc current, forms the output characteristic of the power supply. The output characteristic determines what the corresponding voltages and currents will be for all the operating points of the power supply or conditions from when the electrode contacts the workpiece to when the arc length is large so that substantially no arc current flows. The amplitude and duration of the pulse current determine how fast the wire is melted away and the size of the droplets. The rate a which the wire is melted must be at or exceed the rate of wire feed to maintain a stable arc length. As the arc length changes, the power supply must be able to respond to the changing arc voltage with arc currents necessary to preheat or melt the wire and thereby to maintain the arc length in the stable range.

One known GMA welding machine uses two power supplies. The first power supply provides the background current and the second supply providing the pulse current. The second power supply may be half or full wave rectified current which may be tied into a line current to provide spray transfer at a rate of 60 or 120 times per second. The problem with this type of device is that it requires two power supplies adding to the power consumption, weight, and cost of the apparatus without easy variance of pulse current duration to control droplet size.

Another known GMA welding machine uses a single power supply that has an output characteristic which may be flat, slighty uprising or slightly drooping. This output characteristic is designed to provide large or rapid changes in current over a relatively small arc length or arc voltage change. Other known power supplies have nonlinear output characteristics including a background current segment and a pulse current segment with a transient current segment for shifting between background and pulse currents as the arc length changes. Such nonlinear characteristics may have a steeply drooping outpul characteristic for maintaining a stable background current and preheating the electrode and a flat output characteristic for the pulse current.

The problem with these systems is that the power supplies can neither adequately control the changes in arc current from background to pulse and back to be autoregulating nor provide the stable arc current amplitudes and durations needed to preheat and then melt the electrode wire. Consequently a stable spray metal transfer is not achieved over sustained use. Instability can result from the electrode wire contacting the work piece, the arc self-extinguishing or burning back, or the electrode wire being melted back to a point too far from the work piece to remain within the autoregulating capability of the welding machine.

One welding machine power supply that attempts to control the output current level is shown in Amin, M., Metal Construction, page 349, June 1981. An electronic control system adjusts the pulse current repeat frequency, amplitude, duration, and background arc current in response to the wire feed rate and automatically alters the current parameters to balance the wire feed and wire burn-off rates, to establish a constant arc length. The problem with this system is that there is no direct relationship between the arc length and the four welding parameters so that any change in arc length, not a result of the wire feed rate, will destroy the arc burning stability.

Another known power supply, as shown in Ueguri European Patent Application No. 81105288.5, controls the power source output by responding to the detected arc voltage. An integrated circuit is used to detect the arc length and corresponding arc voltage for appropriately adjusting the four welding parameters during the welding process. The problem with this approach is that the transient response of the integrated circuit control apparatus is not fast enough to correct for disturbances as disturbances occur, defeating the autoregulating ability.

Several other problems are associated with conventional methods of signal detecting and conventional control circuits for electronic switching. For example, due to static error of closed loop feedback and the variation of position and slope of segments, it is very difficult to superimpose the arc current transfer point and the real crossover point of nonlinear output characteristic segments. The error resulting from attempting to connect the transfer point and the real crossover point creates a dead zone, an overlap zone, or an oscillation zone near the crossover point. This mismatch of the multi-segmental output characteristic results in inadequate autoregulating performance.

It is therefore an object of this invention to provide an autoregulating power supply that responds to changing arc voltage and arc length by providing a proper arc current to maintain stable GMA welding.

Another object of this invention is to provide a power supply having an output characteristic what is muti-segmented without significant crossover mismatch and has a very fast response time to maintain stable GMA weding.

It is another object of this invention to provide a pulsed GMA welding power supply that has a continuous, nonlinear moving output characteristic which is dependent upon the arc voltage and is monitored by a scanning circuit to provide the arc current required in an amplitude and for a duration appropriate for stable arc and spray metal transfer.

SUMMARY OF THE INVENTION

This invention relates to GMA welding machines having power supplies that are autoregulating for stable welding arc and spray metal transfer. A self-adaptive or autoregulating control system (herein "TSAD") is used in connection with a power supply output characteristic for pulsed arc welding of the selected materials that is multi-segmented wherein each segment is defined by a selected output voltage range and a selected arc current range for a predetermined welding condition. The segments are constructed so that for different arc lengths relating to different arc voltage ranges, an arc current will be provided to preheat or melt the electrode wire accordingly. Different pulse current levels may be provided for in the same power supply where two different rates of electrode burn-off or droplet size are required, without having to adjust the arc current parameters. The output characteristic also contains a segment having a varying slope or moving output characteristic for rapidly changing the arc current from one background current level to another or to a pulse current level as desired. Movement of the operating point from one current level to another is initiated by triggering the power supply to change the arc operating point when the arc length or arc voltage changes and the output voltage of the power supply crosses a predetermined threshold level. Similarly, any pulse arc current can be changed rapidy to another or to a background current when a second predetermined threshold is crossed.

In a preferred embodiment, the multi-segmented output characteristic comprises (1) a background current segment having very large slope for maintaining the background current stable, preventing arc extinction, and preventing arc burnback when the arc length and arc voltage are at the large and high end of the stable range respectively, preferaby the large slope being positive to provide for a greater background current for the largest arc length in the stable range; (2) a vertical segment for providing a constant pulse arc current for a selected range of arc lengths and voltages to maintain stable spray metal droplet transfer; and (3) a moving segment having variable slope which is used for accelerating the arc current transient back and forth between the background current and the pulse current levels as determined by the selected upper and lower thresholds. The balance of the output characteristic may include segments for near and at short circuit conditions, segments for near or at open circuit conditions, and a nonlinear segment connecting the background current segment to the moving output characteristic.

The control system comprises a scanning circuit which responds to relative changes between arc voltage or arc length and the output characteristic in accordance with preselected upper and lower thresholds of the arc length or arc voltage. In the preferred embodiment, the upper and lower threshholds are determined by presetting the air gap range between the electrode wire and the work piece, thereby defining the moving or varying slope segment of the output characteristic of the power supply. The combination of the operating point—the current and voltage parameters—of the power supply and the threshhold triggers on the output characteristic of the power supply establishes the autoregulating control system.

When the arc voltage decreases because the air gap is getting smaller, the output voltage responds by decreasing to match the arc voltage. When decreasing output voltage crosses the lower threshhold and the power supply is providing a background current, the control circuit is triggered to increase the current from the background level to the pulse level. The moving output segment is then biased to be connected to the background current characteristic at the lower threshold limit, the location representing the smallest air gap in the autoregulating range. The moving segment creates a current bridge intersecting the pulse current characteristic segment at a point on the pulse current segment below the upper threshold level limit. Thus, the electrode is prevented from contacting the work piece because the spray transfer resulting from the pulse current melts and shortens the electrode and increases the arc length and the arc voltage. The control circuit is similarly triggered when the increasing output voltage, responding to changing arc voltage or arc length, crosses the upper threshold. The moving characteristic creates a second current bridge effectively connecting the pulse current characteristic segment at the upper threshold, corresponding to the largest air gap in the autoregulating range, to the background current segment at a point above the lower threshold limit. The arc current, which is the same as the output current of the power supply, is thus rapidly changed from the pulse level back to the background level. The still advancing electrode wire, not being melted, shortens the arc length, decreasing the arc voltage and the output voltage, until the lower threshold is crossed. By maintaining the arc length within the threshold parameters, the control circuit maintains a stable arc an stable spray metal transfer.

The variation in arc current which results from the change in arc length due to the advancing or retreating electrode wire in the absence or presence of wire burn-off respectively, is detected as a rate of change. The rate is used as a factor to accelerate the switching of the operating point of the power supply from one output segment to another along the moving output segments. The greater the difference between the output voltage of the power supply and the determined arc voltage, the faster the arc current will change, and the faster the arc operating point will travel along the current bridge between the background current and pulse current. This provides the fast transient response time keeping the arc length in a relatively small range for improved stability.

The output characteristic is multi-segmented and can contain a plurality of segments with varying slopes. In the preferred embodiment, the power supply is transistorized and can adjust the current and voltage output automatically without the need for extra circuitry so that the arc current will be at the optimum state. The segmental output characteristic has the advantage of minimizing dissipated power loss in the main circuit.

It is also preferred that the wire feed control system be monitored so that the automatic transfer circuit can respond to the variation of the rate of wire feed. In this way, a reference signal can be generated to compensate for changes in arc length so that proper spray metal transfer is achieved. Other advantages of the TSAD machines in accordance with this invention are improved stable welding arc, optimum spray metal transfer without spattering, shorting, or globular deposition of filler metal, the ability to weld with pulsed or programmed wire feed, and one knob control of the wire feed rate without having to adjust the welding current parameters, thereby simplifying stable welding operation.

GMA welding machines with power supplies in accordance with this invention are particularly useful for welding with improved bead penetration and profie control, improved heat input control, welding of aluminum and aluminum alloys with mesospray metal transfer mode, and carbon dioxide welding. These machines are particularly adaptable for use in industrial welding robots and other automatic pulsed gas metal arc welding applications.

DETAILED DESCRIPTION OF THE DRAWINGS

Figure 1:
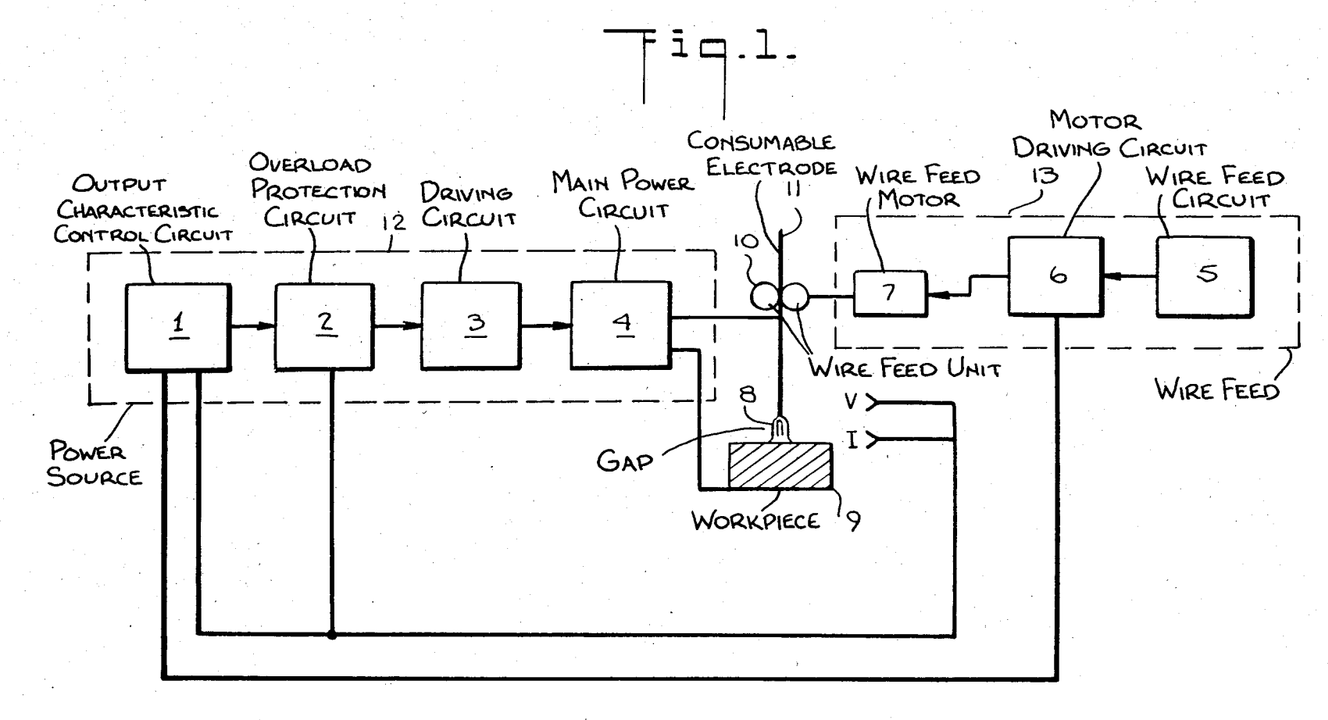
FIG. 1 is a block diagram illustrating the TSAD welding machine in accordance with an embodiment of this invention.

Referring to FIG. 1, a TSAD autoregulating welding machine, in accordance with a preferred embodiment of this invention, comprises welding power source 12 having output characteristic control circuit 1, overload protection circuit 2, driving circuit 3, and main power circuit 4, and wire feeding unit 13 having pulsed wire feeding circuit 5, motor driving circuit 6, and wire feed motor 7. Wire 11 may be any commercially available filler metal electrode wire having composition and dimensions known to those skilled in the art. Eectrode wire 11 is preferably steel wire having a diameter in the range of, for example, 0.8 mm to about 1.6 mm. Wire 11 is advanced towards workpiece 9 by wire feed unit 10, controlled by wire feed motor 7. The lead edge of wire 11 is adjacent to and a distance from workpiece 9 at area 8, forming the air gap measured as an arc length where spray metal transfer occurs. See also FIG. 9. Output characteristic control circuit 1 is a feedback control circuit having as inputs output voltage V and output arc current I. One output terminal of main power circuit 4 is connected to wire 11 and the other output terminal is connected to workpiece 9 in order to create an arc in area 8 between wire 11 and workpiece 9.

Figure 2:
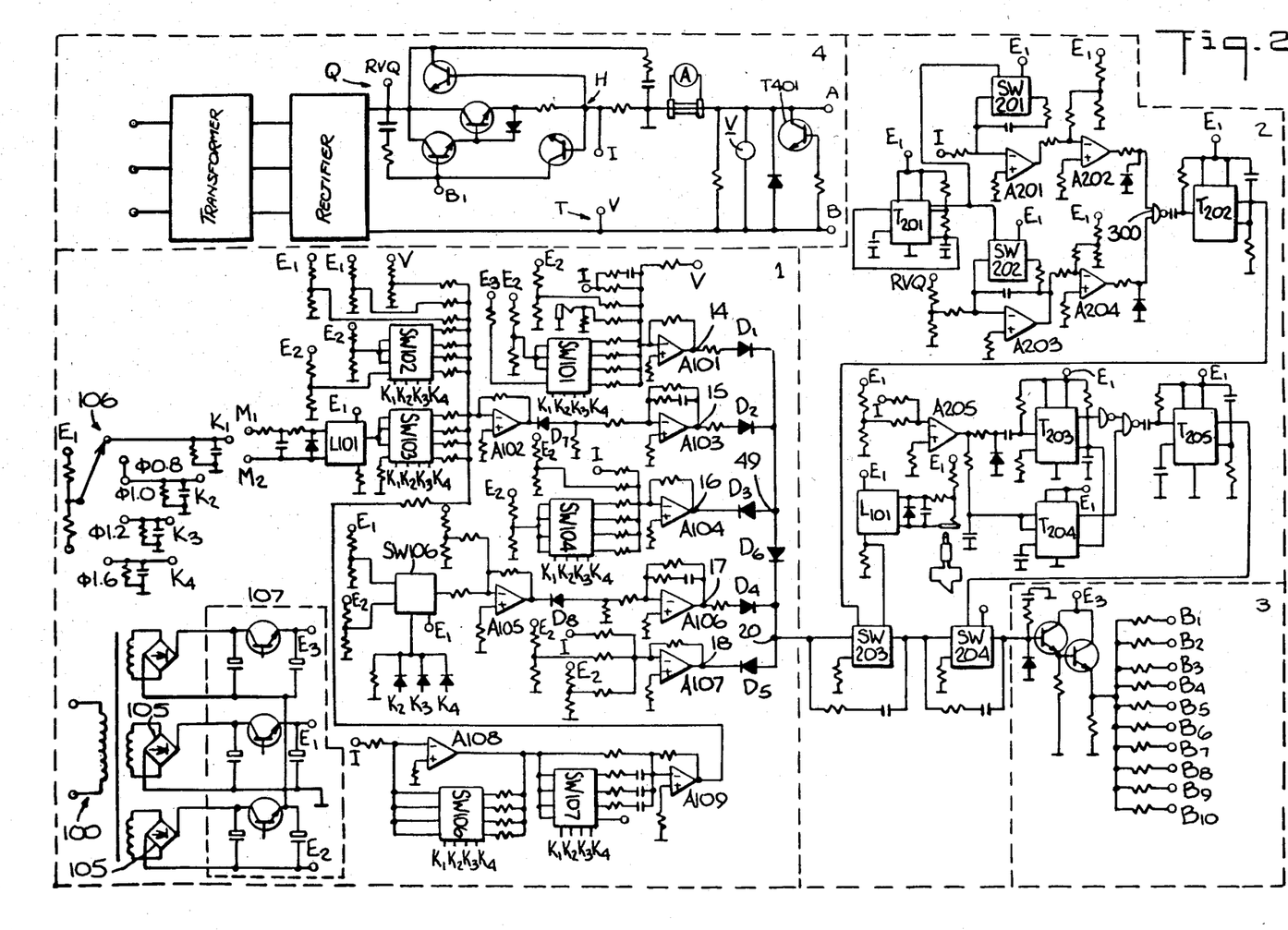
FIG. 2 is a schematic diagram of the power supply of FIG. 1.
Figure 4:
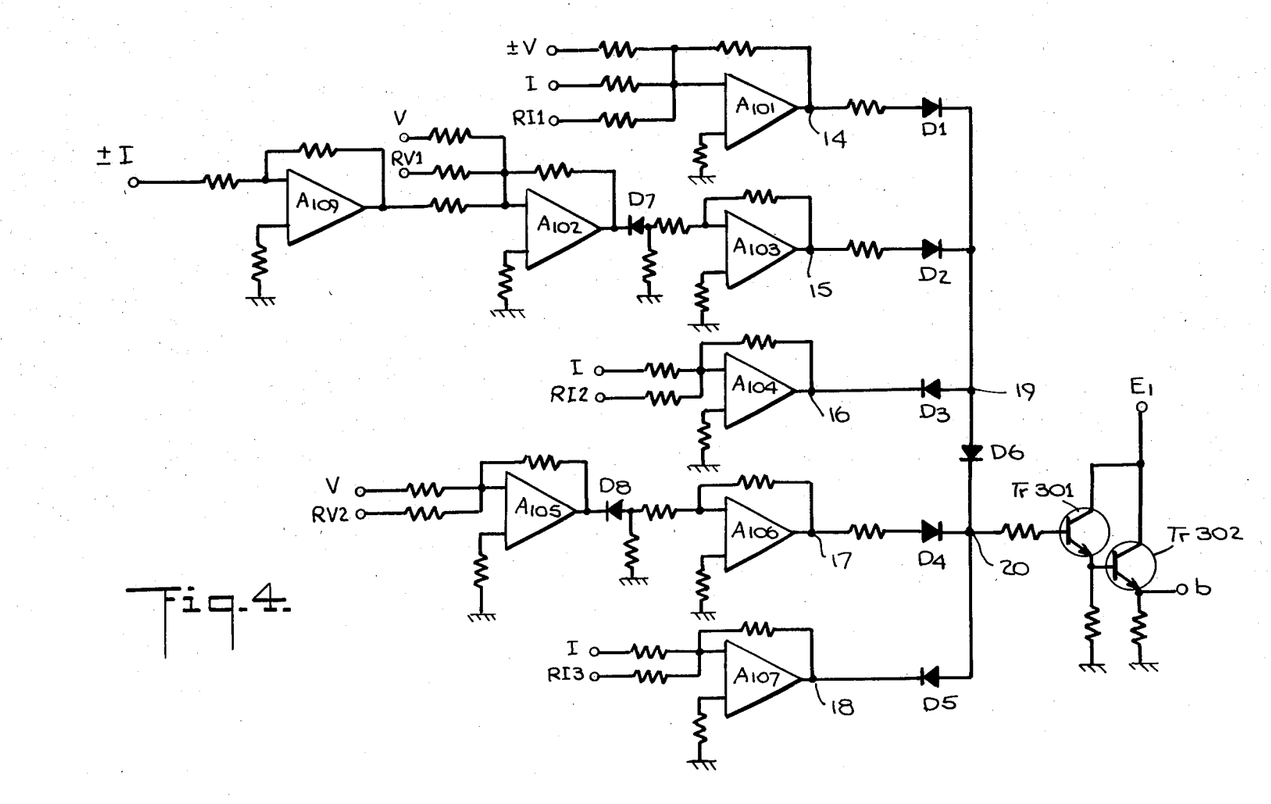
FIG. 4 is a detailed schematic diagram of a part of the power supply of FIG. 2 corresponding to the output characteristic of FIG. 3.
Figure 5:
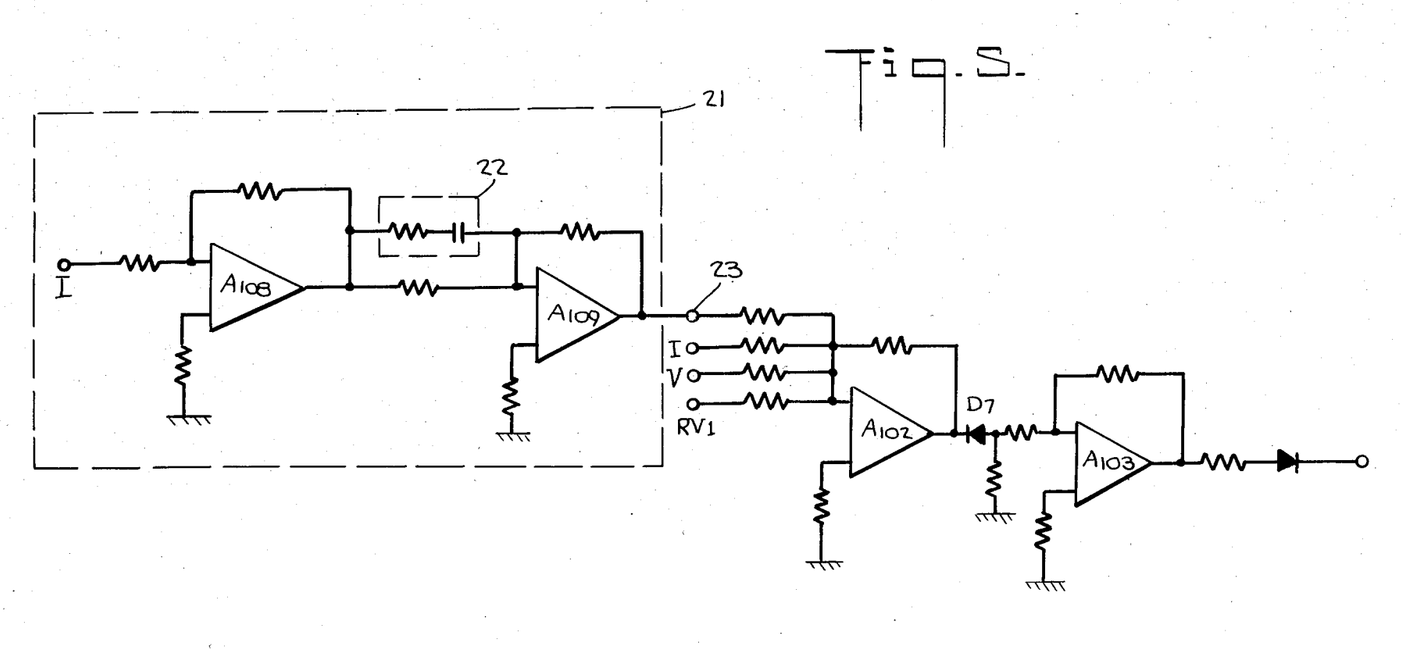
FIG. 5 is a detailed schematic diagram of a part of FIG. 2, corresponding to the moving output characteristic.

Referring to FIG. 2, output characteristic control circuit 1 comprises an automatic transfer circuit for the multi-segmental characteristic of welding power supply 12 and a scanning circuit for the moving output characteristic with varying slope as shown in FIGS. 4 and 5 respectively. Main power circuit 4 does not rely on any inductive elements other than the inevitable loop of the welding cables. See FIGS. 4 and 8. In using power transistors, power supply 12 eliminates the inductive elements heretofore required for GMA arc welding, thus minimizing the transient time constant (L/R) of current driving circuit 3 and improving the dynamic time response property of power supply 12.

Figure 3:
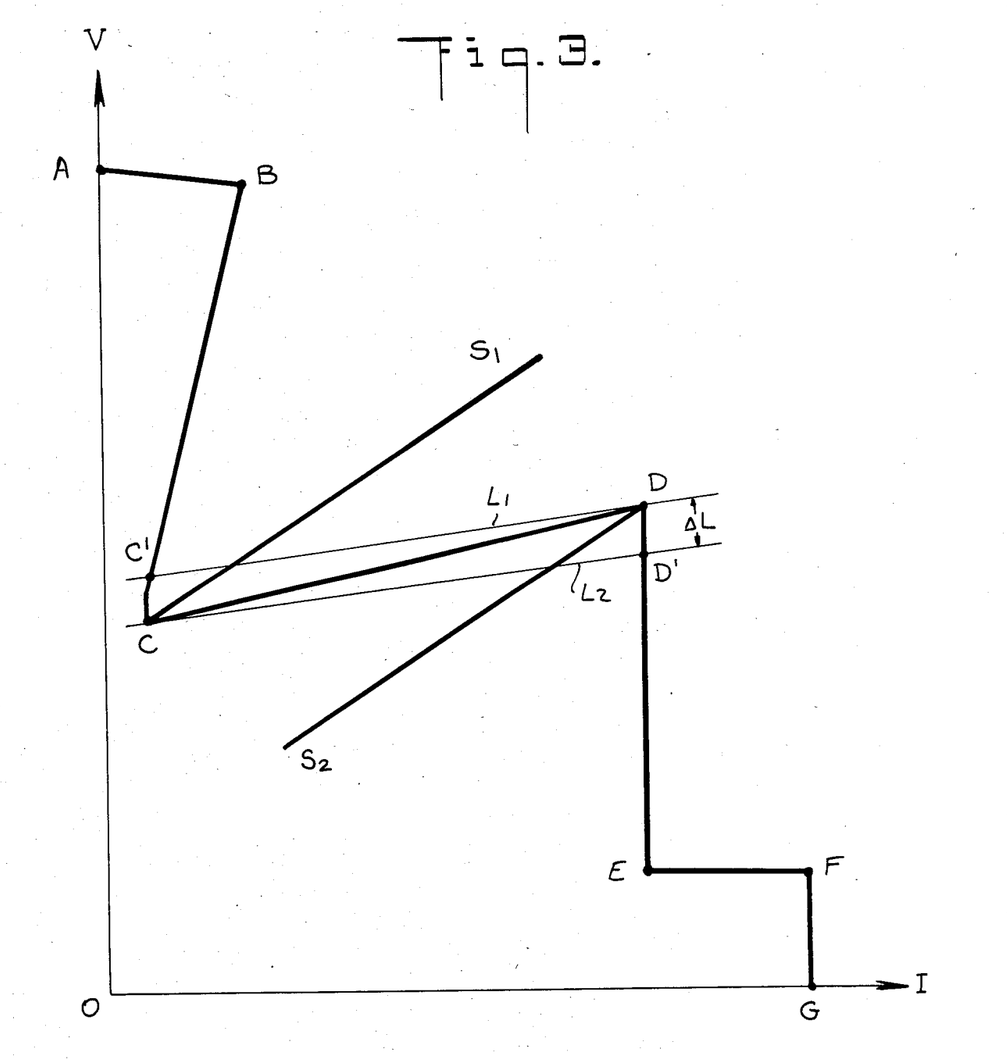
FIG. 3 is a graphical representation of the output characteristic of the power supply of FIG. 2.

Referring to FIG. 3, the multi-segmental and moving output characteristic voltage V plotted against arc current I, consists of an open circuit point, a short circuit point, and several connected output characteristic segments: A is the open circuit point representing substantialy no arc current flow; AB is the segment between open circuit and background current operation near the open circuit arc voltage point A; BC is a segment having very high positive slope for keeping the background arc fully stable between open circuit arc voltage and lower arc length threshold $L_2$, preferably being slightly inclined to the left with respect to the vertical segment; CD is a segment between lower arc length threshold $L_2$ and upper arc length threshold $L_1$ that connects segments BC and DE together, having varying slope for accelerating the arc current transient between the background current segment C'C and the pulse current segment D'D; DE is a vertical segment for keeping the pulse arc current at constant level for the prescribed range of arc lengths and arc voltages V; EF and FG are segments for controlling short circuit arc voltage and current; and G is the short circuit point where wire 11 contacts workpiece 9. As stated, segments BC, CD, and DE are the autoregulating portions of the output characteristic of power suppy 12.

In conventiona welding machines the background current is decreased when the arc length becomes larger. However, in the preferred embodiment of the present invention, due to the action of segment BC, the higher the arc voltage or the longer the arc length, the greater will be the amplitude of the background current so as to ensure the maintenance and stability of the background arc. Output characteristic segment CD is inclined between scanning locus S1 and S2 corresponding to air gap thresholds $L_2$ and $L_1$, respectively. The circuitry related to segment CD scans due to the slight increment or decrement of arc current. The scanning locus for the threshold moves from segment CD to S1 or from segment CD to S2 and thus provides the moving output characteristic with varying slope.

Assuming that the arc length is $L_1$ at the first moment, and the arc operating point is at C', the welding current for this condition is at the low background arc level so that the arc at area 8 wil maintain itself, preheating wire 11 without any spray metal transfer occurring. The arc length decreases as wire 11 is advanced by wire feed unit 13 and the operating point I,V of power supply 12 moves downward from C' to C. Once operating point I,V reaches point C and crosses scanning locus S1 and the electrode wire crosses threshold $L_2$, the trigger sweep occurs immediately along segment CD which detects the variation of background current 1. In the scanning process, output voltage V of power source 12 is greater than the arc voltage across the arc length so the arc operating point is driven rapidly from C to D'. Arc welding current I, the same as the output current, becomes very high at the predetermined pulse current level and spray metal transfer starts. With oontinued pulse current and spray metal transfer, the arc length increases (see FIG. 9). Once operating point I,V reaches point D and crosses scanning locus S2 and the electrode wire crosses threshold $L_1$, by means of the scanning action of the circuitry related to segment CD, the output voltage of power source 12 is lower than the arc voltage drop across the arc length, so that the arc operating point is driven rapidly from D to C'.

The above process is automatically repeated as the arc length varies within upper and lower arc length threshold limits $L_1$ and $L_2$ while operating point I,V moves along the path on the edges of trapezoid C'CD'DC', so that the output of the welding power source changes automatically according to the fluctuation of arc length.

There are several advantages to this control characteristic. First, the arc length is kept within the interval between $L_1$ and $L_2$, or $\Delta L$, wherein $\Delta L$ is preferably equal to the diameter of wire 11. The absolute value of $L_1$, $L_2$, and $\Delta L$ may be adjusted by changing the reference parameters and position of trapezoid C'CD'DC' and the scanning loci S1 and S2 as explained below. Second, metal transfer proceeds at a constant current condition, the magnitude of which can be preset by the parameter of the segment DE. Therefore, optimum spray transfer mode can be easily ensured. Third, the arc current level changes automatically in response to the arc length, avoiding problems associated with known power suppies that automaticaly respond to the arc length as in compulsory pulsed arc welding or closed loop control MIG welding. Fourth, the pulsed arc current can adapt itself to any change of wire feed rate, intended and unintended, and respond quickly to any kind of arc length disturbance. Thus, a welding machine in accordance with this invention may be used with pused wire feed welding technology and have only one operator-adjustable knob for selecting welding conditions by selecting the wire feed rate.

Referring to FIG. 2, power supply 12 is described in more detail. In control circuit 1 at area 100, line voltage is fed into transformer 104 which, using rectifiers 105 and smoothing filters 107, provides three DC voltages $E_1$, $E_2$ and $E_3$. Preferably, voltages $E_1$, $E_2$ and $E_3$ are of different values and are used for creating reference voltages and currents, and as biasing and offsetting signals used in power supply 12.

Switch 106 is adjustable by the operator and, in the preferred embodiment, selects for one of four differenty dimensioned commony used eectrode wires. For example wires having diameters of 0.8 mm, 1.0 mm, 1.2 mm, and 1.6 mm may be used. Each different dimensioned wire requires different power supply operating characteristics so that the electrode wire used will be properly heated and melted to maintain stable arc and stable spray metal transfer. Therefore, selection of wire having a diameter of 0.8 mm will pass signal $E_1$ through a selected resistance network and produce output $K_1$ which will be a fraction of reference voltage $E_1$ as determined by the selected resistance relationships in switch 106 associated with output $K_1$. The other outputs corresponding to the three larger diameter wires, $K_2$, $K_3$, and $K_4$, respectively, will not have any input signal and are grounded, having about zero voltage. To select wire of diameter 1.2 mm, signal $E_1$ will be inputted to the resistance network associated with output $K_3$ so that no signal will be inputted to the grounded resistance networks associated with outputs $K_1$, $K_2$, and $K_4$. The value of selected signal $K_n$ will thus depend upon the values of the resistances selected in switch 106 and may be the same for each diameter wire. Such an arrangement provides switch 106 with a four bit output word, $K_1$-$K_4$, which can be used to control analog switches for establishing the reference voltages and currents needed to select for the desired output characteristic of power supply 12. An alternate embodiment for adjusting the output characteristic to correspond to the electrode wire size could use different resistance networks in switch 106 so that different fractions of signal $E_1$ will be provided to outputs $K_1$-$K_4$. Thus the output characteristics could be adjusted by selecting one of the different values of $K_1$-$K_4$ instead of the reference votages provided as described below. Another embodiment could use a single input K instead of a plurality of signals for providing a reference voltage and appropriate circuitry to provide the different reference voltages needed to shift the output characteristic for the different diameter wires as appropriate.

Referring to FIGS. 2 and 4, control circuit 1, otherwise referred to as the automatic transfer circuit, is shown in connection with determining the output characteristic of power supply 12. Amplifier A101 has three inputs, arc current I detected from terminal H of main power circuit 4, output voltage V detected at terminal T of main power circuit 4, and reference current RI1, all of which are summed together and inputted to the inverting input. The output of amplifier A101 is connected to diode D1. Diode D1 is connected to diode D6 so that when the sum of the inputs to amplifier A101 are less than zero, diodes D1 and D6 are biased closed. As long as the sum of arc current I and output voltage V are greater than reference current RI1, the output of amplifier A101 will be outputted to node 20 and will produce a signal at node B that will be along segment BC for varying signals V and I. The reference values for the other circuits are selected so that diodes D2-D5 are biased open when the operating point is on segment BC.

Output voltage V is input to amplifier A101 and can be either positive or negative to cause the slope of segment BC to be either positive or negative and slighty incined to the vertical axis, depending upon the magnitude and polarity of signal V. When the sum of output voltage V and arc current I across their respective input resistors falls below reference signal RI1 across its input resistor, diode D1 will open, causing the output characteristic of control circuit 1 to shift from segment BC to the adjacent segment where diode D2 is biased closed by the decreasing output signal V falling below reference voltage signal RV1.

Reference current signal RI1, input to amplifier A101, is the sum of the currents determined by reference signals $E_2$ passing through a resistor network, and through analog switch SW101. The value of signal RI1 can be varied by adjusting the values of the resistors used in the resistor network, preferably by selecting how the reference signals are to passed through analog switch SW101 as controlled by outputs $K_1$-$K_4$ of switch 106. Thus, for different dimensioned wires, changing switch 106 will change the relative values of signals $K_1$-$K_4$ and consequently change the value of the currents passing through switch SW101, resulting in a different value for reference current RI1. A different value for signal RI1 will change the location of output segment BC to correspond to the operating range needed for an arc current and output voltage of selected wire diameter. By changing the reference voltages and currents for the output segments, the output characteristic, including the stabe arc and spray transfer trapezoid C'CD'DC', can be moved.

Referring to FIGS. 2, 4, and 5, the circuitry for segment CD includes scanning circuit 21 for providing a moving output characteristic with varying slope and amplifiers A102 and A103. When the voltage at node 15 is positive, diode D2 will be biased cosed. Segment CD control circuitry comprises amplifiers A102, A103, A108 and A109. The input to scanning circuit 21 at amplifier A108 is arc current I which may be a negative signal or a positive signal for making the otherwise flat output characteristic segment upgoing or downgoing between points C and D, depending on the magnitude and the polarity of arc current 1.

In FIG. 3, the segment CD is bounded by upper threshold $L_1$ for limiting the maximum arc length and lower threshold $L_2$ for limiting the minimum arc length, and represents the moving output characteristic with varying slope. Thresholds $L_1$ and $L_2$ are represented by the reference voltages and currents used to control the automatic transfer circuitry.

Referring to FIG. 5, the signal at node 23 is also input to operational amplifier A102 from the scanning circuit 21. Scanning circuit 21 consists of operational amplifier A108, inverter amplifier A109, and differential circuit 22. If the operating point stays at a constant current condition, scanning circuit 21 plays no role on the feedback loop for segment CD and amplifiers A108 and A109 output a signal of constant amplitude to amplifier A102 which has the effect of increasing very slightly the slope of the segment CD. However, when the operating point reaches point C from C', representative of the arc length reaching lower threshold $L_2$, arc current I increases quickly along the current bridge or arc static characteristic CD', and scanning circuit 21 differentiates the value of arc current I with respect to time using the resistor and capacitor of differential circuit 22. Amplified current increment or decrement dI/dt from differential circuit 22 is input to node 23. The other signals added to the same input of amplifier A102 are arc current I, output voltage V, and reference voltage RV1. The output of amplifier A102 is fed to amplifier A103 to produce operating point I, V on output characteristic CD at node 15 when the magnitude of arc current 1 and output voltage V is greater than the magnitude of reference signal RV1 and arc current differential dI/dt. Signal dI/dt, the output of A109, produces the varying slope characteristic.

When arc operating point moves from C to D' the changing rate of welding current dI/dt increases and then decreases, and the output of A109 at node 23 increases at first and decreases afterwards. This result is the scanning action of segment CD in first the counterclockwise direction as shown in FIG. 3, and second in the clockwise direction. Similarly when the arc operating point moves from D to C', representative of crossing upper threshold $L_1$, arc current I tends lo decrease along the arc segment DC''and amplified increment or decrement dI/dt is sent to node 23 by scanning circuit 21.

Referring to FIG. 2, scanning circuit 21 is shown in more detail. Analog switch SW106 provides the different resistance values for the feedback circuit of inverting amplifier A108 as selected by switch 106 and signals $K_1$-$K_4$ for the different electrode wire diameters. Similarly, analog switch SW107 provides the differentiating resistor and capacitor network for the input of amplifier A109 as selected by switch 106. The other inputs to amplifier A102 include the outputs of switch SW102 which will be a fraction of at least one of reference signals $E_1$ and $E_2$ as appropriate for the chosen wire diameter and as channeled through switch SW102 by switch 106 and signals $K_1$-$K_4$. The other input to amplifier A102 is the output of switch SW103 which is signal M output by terminals $M_1$ and $M_2$ of wire feed motor drive circuit 6 (see FIG. 8). Signal M is coupled from motor drive circuit 6 to switch SW103 through optical coupler L101. Thus, the rate of the advance of electrode wire 11 is also input to amplifier A102 so that fluctuations in wire speed as they affect arc length can be incorporated into the control circuit. The automatic transfer circuitry can thus react to the changing arc length and corresponding arc voltage as both a physical parameter from wire speed and an electrical parameter from arc current change dI/dt to effect rapid change in power supply operating point I,V between background current and pulse current while maintaining stabe arc and stable spray metal transfer.

Diode D7 between amplifiers A102 and A103 is biased open to prevent leakage current from amplifier A102 from reaching amplifier A103, the latter being an inverting amplifier, when the relationship between the magnitude of differentiated arc current dI/dt and output votage V and the sum of reference voltage RV1, motor drive voltage M (output by switch SW103) provides a negative signal at the inverting input of amplifier A102. When the input is positive, the output of amplifier A102 will be negative, closing diode D7, and providing a positive output at amplifier A103 thereby closing diode D2 and resulting in the operating point of power supply 12 being on segment CD.

Referring to FIGS. 2 and 4, output characteristic segment DE is determined by amplifier A104 which has as inputs the sum of arc current I and second reference current R12. Reference signal R12 is selected by the operation of switch 106 which provides signals $K_1$-$K_4$, to channel signa $E_2$ through analog switch SW104 over the appropriate resistance network where it is added to signal $E_2$, as appropriate for the selected electrode wire diameter. The output of amplifier A104 is connected to diode D3. When the output of amplifier 104 is negative, diode D3 is closed and conducting, thereby clamping the signal at node 19 negative, opening diode D6, and providing the lower limit of the output voltage for segment DC. As amplifier A104 changes from positive to negative, the signal output at amplifier A103 at node 15 reaches a relatively constant maximum and becomes independent of arc voltage so as to provided constant arc current 1 independent of output voltage and a vertical segment DE until the relationship between arc current I and reference current RI2 provides amplifier A104 with a negative output.

Segments EF and FG are similar in design and operation to segments CD and DE respectively. Inputs to amplifier A105 are output voltage V and reference voltage RV2. Voltage RV2 is preferably less than reference voltage V1R, indicating that the arc length is less while the arc operating point is on segments EF and FG than when on segments BC or CD. When the output of amplifier A105 is negative, diode D8 closes and amplifier A106 inverts the signal, providing a positive output to close diode D4, providing a flat output characteristic EF when output arc voltage V is greater reference voltage RV2. The clamping action of amplifier A104 will cause diode D6 to open and turn off the operating characteristic for segments BC, CD and DE once segment EF has been reached. When arc current I rises above reference current RI3, amplifier A107 has a negative output, closing diode D5, clamping the output signal at node 20, and providing a constant current output at node 20 for a vertical output characteristic segment FG. Reference voltage signal RV2, input to amplifier A106 may be varied by switch 106 and signals $K_2$-$K_4$ as they affect analog switch SW105.

The automatic transfer circuit described above utilizes the arc current, output voltage and motor speed feedback with a diode network to correlate and connect the plurality of segments having different slope at their endpoints. The operation of the automatic transfer circuit, comprising five feedback circuits summarized as a first feedback circuit having amplifier A101 for obtaining segment BC, a second feedback circuit having amplifiers A102 and A103 for obtaining segment CD, a third feedback circuit having amplifier A104 for obtaining segment DE, a fourth feedback circuit having amplifiers A105 and A106 for obtaining segment EF, and a fifth feedback circuit having amplifier A107 for obtaining segment FG, is now described. Assuming that the arc operating point is on segment BC, the first feedback circuit is in operation, diode D1 being conducting and the signal level at node 14 is positive. In the second feedback circuit, because /V/>>/RV1/, the signal level at node 15 is in negative saturation and diode D2 is open circuited. In the third feedback circuit, /R12/>>/I/ so that output signal at node 16 is in positive saturation and diode D3 is open circuited. Similarly the signal level at node 17 is in negative saturation, opening diode D4, and the signal at node 18 is in positive saturation opening diode D5. It can be seen that the second through fifth feedback circuits are blocked off by the diodes D2, D3, D4, and D5, whereas the first feedback circuit is conducting. Should the arc operating point move to a location on segment CD, the output signal of the first feedback circuit at node 14 becomes negative because /I/>>/RI1/. The second feedback circuit becomes operative as the signal at its output node 15 is positive and diode D2 is conducting. The outputs of the third, fourth, and fifth feedback circuits remain the same as above i.e. positive at node 16, negative at node 17, and positive at node 18. Therefore all feedback circuits are blocked off by the diodes except the second feedback circuit. The third feedback circuit comprises a current clamper circuit which is different in function from the first and second feedback circuits. When the arc operating point is at a location on segment DE, the third feedback circuit operates and the signal at node 16 is positive, node 17 is negative, and node 18 is positive. Therefore only the first, fourth, and fifth circuits are blocked off by their respective diodes. The second circuit cannot be blocked because of its positive output biasing diode D2 closed. The output signal at node 19 is controled by the clamper potential at node 16 rather than the output potential at node 15. Thus, when the arc operating point moves down segment DE and passes point E onto segment EF, the output signal of the third feedback loop is in negative saturation closing diode D3 and clamping the signal at node 20 at a negative level so that diode D6 is open circuited to block off the first through third feedback circuits.

The fourth feedback circuit goes into operation as diode D4 closes and operates just like the second feedback circuit. When the arc operating point is on segment EF, the fifth feedback circuit operates as a clamping circuit like the third feedback circuit when the arc operating point is on segment FG. In other words the fourth and fifth circuits may be oonsidered separately, because the third feedback circuit clamps the signal potential 20 at saturated negative level and diode D6 blocks all the upper circuits when the arc operating point enters the segment EF.

Scanning loci S1 and S2 are established by selection of the reference voltages and currents at the boundaries of moving segment CD.

Figure 6:
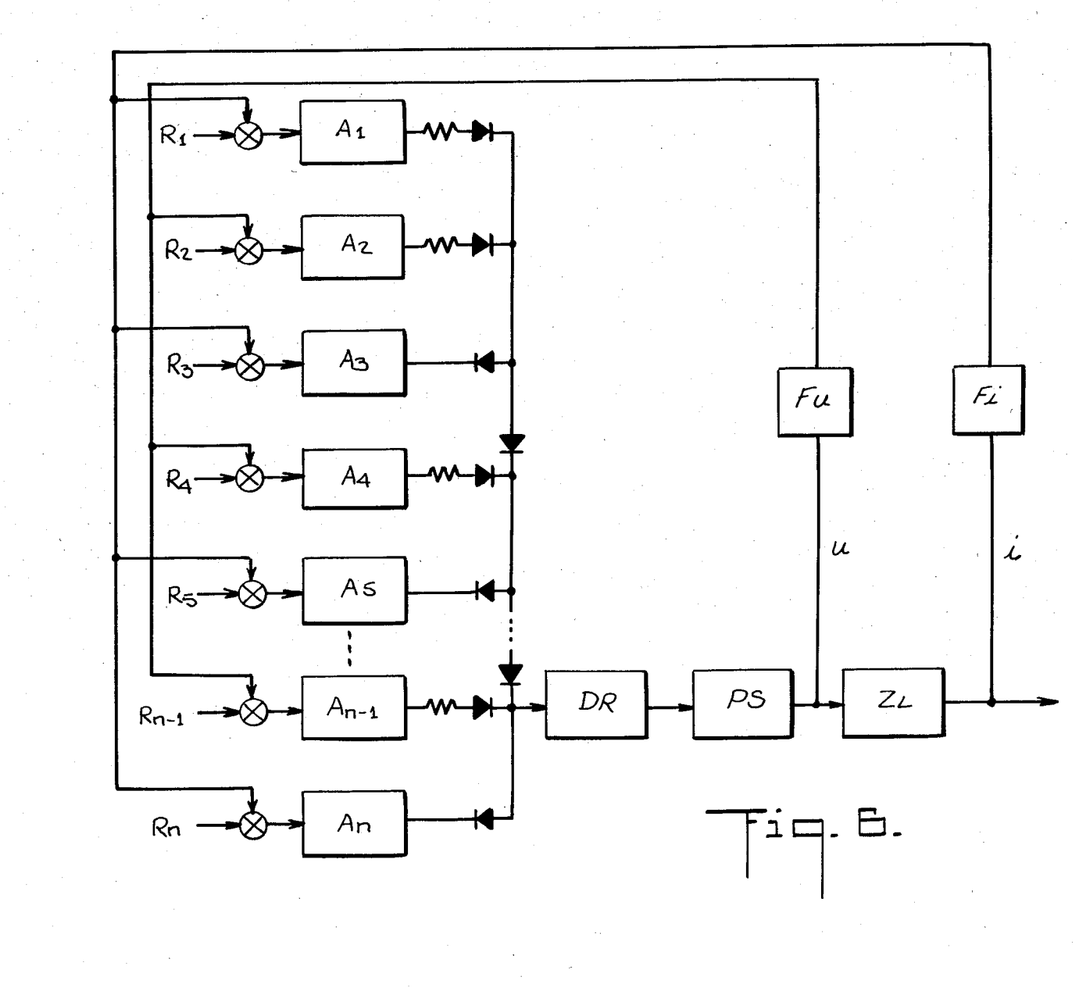
FIG. 6 is a block diagram of the power supply of an embodiment having an output characeristic with an arbitrary number of segments.
Figure 7:
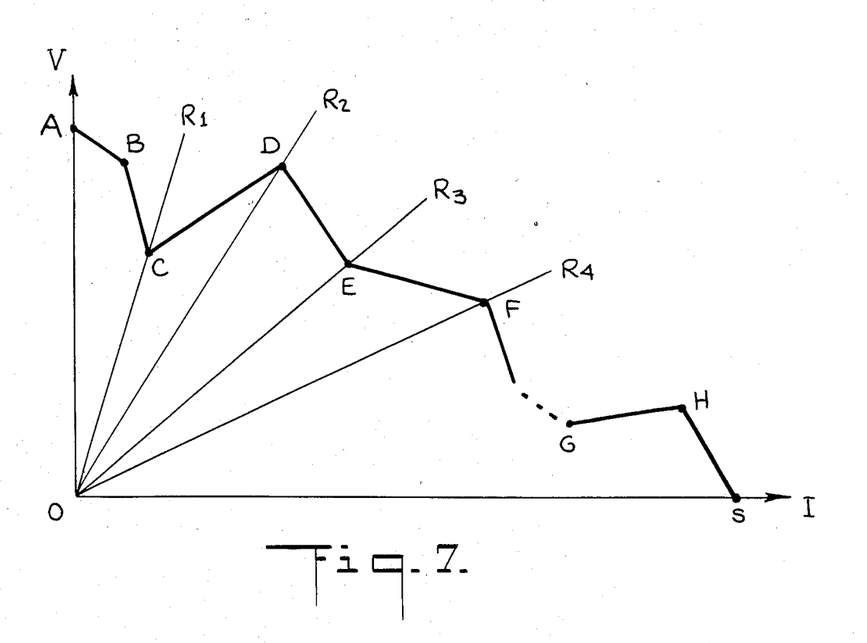
FIG. 7 is a graphical representation of the output characteristic in accordance with the embodiment of FIG. 6.

The principle of this invention relating to the automatic transfer circuit shown in FIG. 4 can be expanded to generate a very compicated output characteristic. With the automatic transfer circuit shown in FIG. 6 one can obtain a multi-segmental output characteristic with an arbitrary number of segments as shown in FIG. 7, provided that the reference signals $R_1$-$R_n$ are selected to correspond to reference current signals RI1, RI2, . . ., RIn, and the reference voltage signals RV1, RV2, . . . RVn, of FIGS. 4 and 5, preferably the reference current signals being progressively increased and the reference voltage signals being progressively decreased. Transfer circuit diodes D1-Dn can be arranged so that given output segments will only operate at preestablished ranges of output currents and voltages. In this way amplifier A3 (FIG. 6) acts as a clamping circuit, similar to amplifier A104 (FIG. 4), and amplifiers A5 and An (FIG. 6) act as clamping circuits, similar to am plifier A107 (FIG. 4), although at different current levels and different slopes, depending on the reference signals and the polarity and amplitude of the feedback output current FI and output voltage FV as detected from the output terminals of load ZL. The output of power supply P5 is across load ZL.

Referring to FIG. 2, overload protection circuit 2 is connected between node B of output characteristic control circuit 1 and current driving circuit 3. The connection passes output B through two analog switches SW203 and SW204 to the input of current driving circuit 3. Switch SW203 has a current limiting resistor and capacitor in parallel with the input and output of the switch to limit the amount of current passed when switch SW203 is opened.

Switch SW203 has two inputs for controlling the gating of the switch. The first input is the output of clock T202 which is an oscillator providing a logical high or low as a result of the logic network comprising clock T201, digital switches SW201 and SW202, amplifiers A201-A204, and NAND gate 300 as shown in FIG. 2. One input to amplifier A201 is arc current I as it appears across its input resistor, where switch SW201 alternately open circuits and close circuits the feedbaok loop in aocordance with the output of clock T201 to control the gain. The output of amplifier A201 is fed to an inverting input of amplifier A202 along with a reference voltage. The output of amplifier A202 is connected to a diode to maintain a reference voltage against ground and input to NAND gate 300. Amplifier A203 has a similar network and timing sequence construction except the input signal is reference voltage RVQ detected at input terminal Q of main power circuit 4.

A second logic circuit comprising amplifier A205 and clocks T203-T205 provide an input signal to analog switch SW204. The input to amplifier A205 is the sum of arc current I and a fraction of reference signal $E_1$ as is appears across an input resistor network. The other input to switch SW204 is reference voltage $E_1$ and the other input to switch SW203 is an optically coupled oscillating signal received from optical coupler L201.

When arc current I becomes large as against the reference voltages, switches SW203 and SW204 will act to limit the current passing through from output characteristic control circuit to the current driving circuit by forcing the current through the current limiting paths. The current overload protection circuit is conventional and does not otherwise form a part of this invention.

Current driving circuit 3 comprises two cascaded amplifying transistors and a resistance network to provide a plurality of outputs B1-B10 having different values.

Main power supply 4 comprises a transformer, a rectifier, and a plurality of cascaded power amplifiers in parallel. In FIG. 2, only one casoade amplifier network is shown for input B1. Additional networks for the rest of the inputs B2-B10 are to be oonnected in parallel at terminals and H having the same construction as the network shown. Similarly a plurality of output transistors T401-T410 are to be provided in parallel across output terminals A and B (only transistor T401, corresponding to input Bl, shown). Thus the needed current is provided by the parallel arrays of power transistors as controlled by the array of input signals B1-B10. Electrode wire 11 is electrically connected to terminal A and work piece 9 is connected to terminal B so that arc current 1 will arc across the gap at area 8. The current driving circuit and he main power supply circuits are conventional circuits and do not otherwise form a part of this invention.

Figure 9:
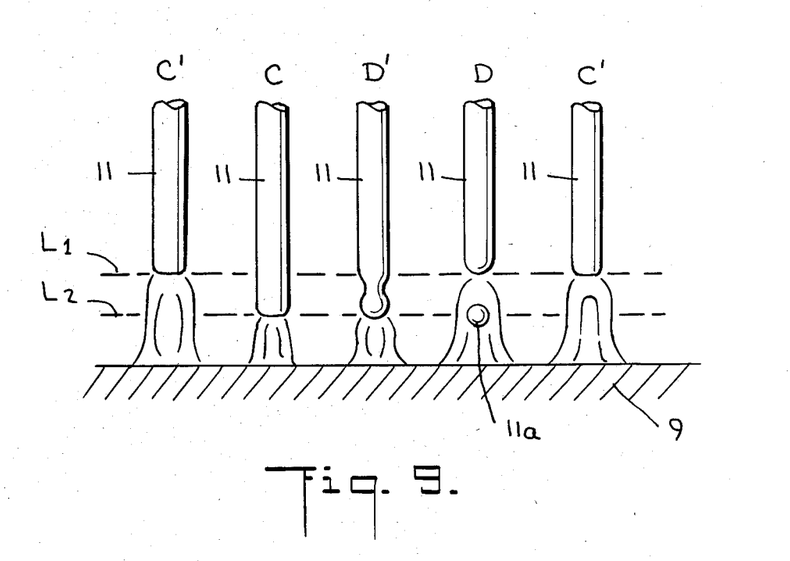
FIG. 9 is a diagram of the varying arc length corresponding to FIG. 3 in accordance with an embodiment of this invention.

Referring to FIGS. 3 and 9, a cycle of arc lengths is shown corresponding to the arc operating point moving along output characteristic trapezoid C'CD'DC'. At C', arc length is at $L_1$, the upper threshold on segment and an arc is in existence. Control circuit 1 detects arc current I and output voltage V. As wire 11 advances and approaches $L_2$, corresponding to position C, the increase in arc current I and decrease in arc voltage V causes control circuit 1 to shift the operating point to D' where the increased arc current begins to melt wire 11. As wire 11 advances, droplet 11a forms as a result of the pulse arc current, separates from wire 11 and is deposited on workpiece 9. This movement shortens wire 11 until the arc length is at about threshold $L_2$ at operating point D. At this point, having crossed threshold $L_2$, arc current decreases as the arc voltage increases, and the operating characteristic rapidly returns to the background current level at C', where the next cycle begins.

Figure 8:
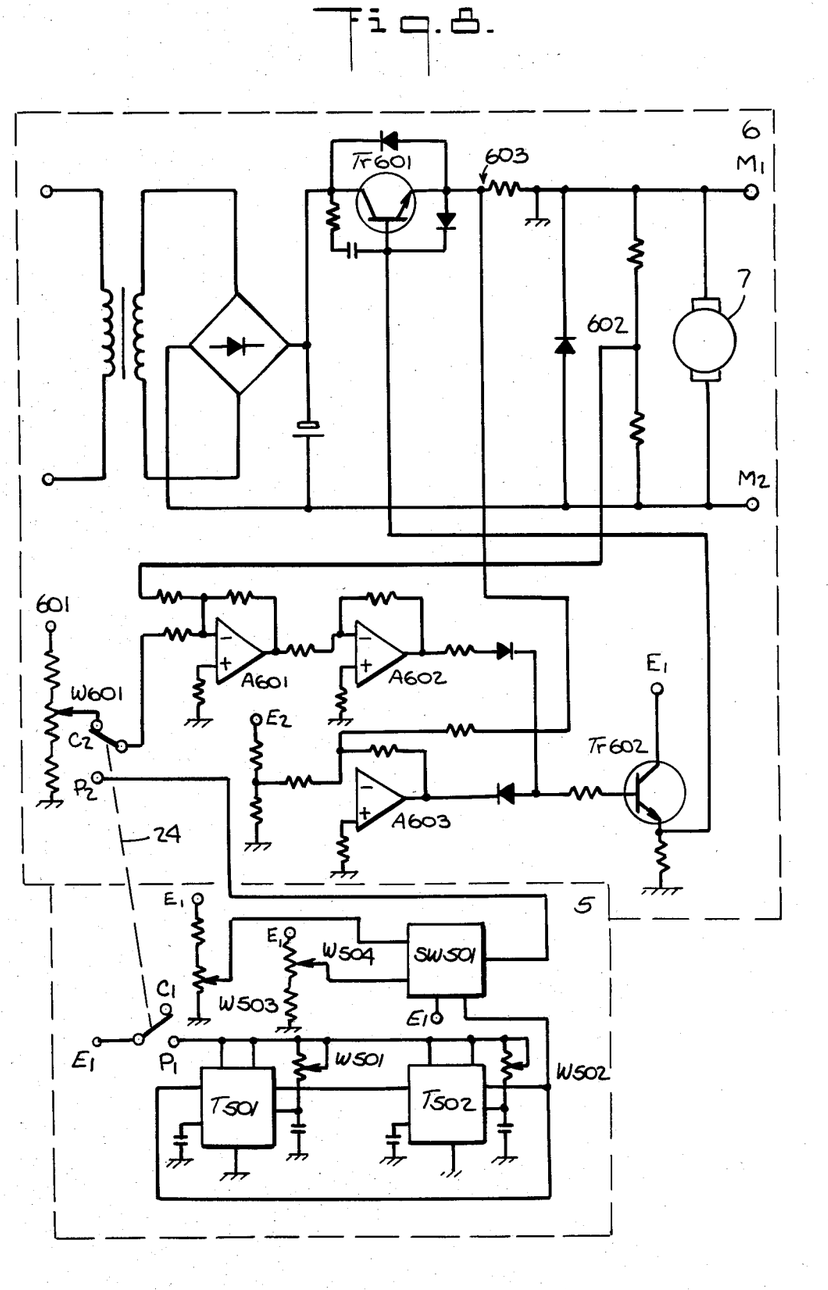
FIG. 8 is a schematic diagram of the wire feed unit of FIG. 1.

Referring to FIG. 8, wire feeding unit 13 controls the speed of wire feeding motor 7 by transistor Tr601. In order to improve the mechanical property of wire feeding unit 13, the negative feedback of armature voltage M is introduced into motor driving circuit 6. The armature voltage M, indicating wire feeding speed at terminals $M_1$ and $M_2$, connects to terminals $M_1$ and $M_2$ of output characteristic circuit 1. The result of the feedback is that segment CD of the output characteristic as shown in FIG. 3 will move upwardy in accordance with the increase of wire feed rate and will cause the arc length to become a little higher, in order to compensate for the faster speed of wire 11. Negative feedback at terminal 602 is used in order to prevent damage to the armature and the transistors from over-load. The output current amplitude from transistor Tr602 is limited by amplifier A603. In the case of constant wire feed rate switch 24 is connected to terminals $C_1$ and $C_2$. The wire feed rate can be adjusted by potentiometer W601 under operator control. In the case of pulsed wire feed welding, switch 24 is instead connected to terminals $P_1$ and $P_2$. The pulse generator oonsists of two monostable triggers T501 and T502. Electronic analog switch SW501 is controlled by trigger T502 and selects for the available reference voltages corresponding to different wire feed rates. The pulsed wire feed rate arc can be adjusted by potentiometers W503 and W504 respectively under operator control. The durations of higher and lower level feed rate is adjusted by potentiometers W501 and W502 respectively under operator control.

The voltage signal of the wire feed function can be input through node 603 during programmed wire feed welding (in this case switch 24 is set at terminals C₁ and C₂).

The TSAD welding machine in accordance with this invention has been tested repeatedly with 1.0, 1.2 and 1.6 mm. dia. steel wire in Ar and $CO_2$ mixed gas. Stable spray metal transfer and arc can be obtained over wide range of welding current as indicated in Table I.

TABLE I

| Wire diameter (mm) | Range of acceptable arc welding current (amps) |
|---|---|
| 1.0 | 45–220 |
| 1.2 | 60–320 |
| 1.6 | 80–360 |

The operating point is typically at one of two points, either on the lower part of segment BC (CC') or on the upper part of segment DE (DD'). In the former case the voltage drop across the power transistor array is high but the current passing through it is very low, forming the background current. In the latter case the current is very high forming the pulse current, but the voltage drop across the power transistor is very low. Therefore the total power loss (IV) is very low. Furthermore, the TSAD welding machine in accordance with this invention is also beneficial for use in MIG welding because it provides a very stable welding arc and spray metal transfer without spattering over wide range of welding current. In addition, the TSAD welding machine is suitable for both pulsed wire feed welding and programmed wire feed welding and has the additional advantage of being a one-knob control welding machine without having to adjust the other welding parameters for easy operation.

We claim:

1. In a welding machine power supply connected to a welding electrode and a workpiece having an operating point including an output voltage and output current detected across the electrode and workpiece, a transfer circuit means for connecting together a plurality of output characteristic segments of the power supply having different slopes and lengths with substantially no overlap or mismatch of endpoints of adjacent segments and allowing movement of the operating point along the output characteristic segments so that the output current and output voltage values at the end of one segment are substantially equal to the operating current and voltage values on the adjacent segment to form a substantially continuous non-linear output characteristic for conditions between open circuit voltage and short circuit voltage, comprising:

First feedback circuit to conduct when the sum of the output current and output voltage signals are greater than a first reference current;

Second feedback circuit to conduct when the output voltage is greater than a first reference voltage;

Third feedback circuit to conduct when the output current is greater than a second reference current;

Fourth feedback circuit to conduct when the output voltage is greater than a second reference voltage;

Fifth feedback circuit to conduct when the output current is greater than a third reference voltage;

First diode to block the operation of the first feedback circuit when the second or third feedback circuit is operating;

Second diode to block the operation of the second feedback circuit when the first feedback circuit is operating;

Third diode to block the operation of the third feedback circuit when the first or second feedback circuit is operating;

Fourth diode to block the operation of the fourth feedback circuit when the first, second, third or fifth feedback circuit is operating;

Fifth diode to block the operation of the fifth feedback circuit when the first, second, third or fourth feedback circuit is operating;

sixth diode connected to the output of the first, second, and third diodes to block the operation of the first, second, and third feedback circuits when the fourth or fifth feedback circuit is operating.

2. A method for controlling the output operating point of a power supply having a multi-segmented moving output characteristic having an output voltage and an output current, including first a segment of very large slope, a second segment of lesser and variable slope, and a third segment being substantially vertical, of substantially constant current, and of relatively higher current than the first segment, adapted for connecting the output to a moving electrode and workpiece arranged so that the distance between the electrode and the workpiece can vary between a first distance and a second distance with a stable arc voltage and arc current being generated across the changing distance comprising:

sensing the operating point in terms of voltage and current;

heating the electrode wire with a first current level when the operating point is on the first segment;

comparing the operating point to a first reference signal corresponding to the first distance so that when the operating point is on the first segment and corresponds to the reference signal the operating point may be rapidly moved along the second segment to a point on the third segment;

melting the electrode wire when the operaling point is on the third segment with a second current level, thereby increasing the distance between the electrode and the workpiece;

comparing the operating point to a second reference signal corresponding to the second distance so that when the operating point is on the third segment and corresponds to the reference signal the operating point may be rapidly moved along the second segment to a point on the first segment; and rapidly moving the operating point along the second segment in response to the distance between the electrode and the workpiece when the arc voltage is not substantially equal to the output voltage and the output voltage corresponds to one of the first or second reference signals so that the operating point will be moved along the second segment from one of the first and third segments to the other segment.

3. The method of claim 2 further comprising:

moving the operating point along the second segment in response to the rate of change of the current component of the output characteristic, the rate being directly related to the amount by which the arc voltage differs from the output voltage so that the greater the rate the faster the movement of the operating point along the segment.

4. The method of claim comprising:

moving the operating point along the second segment in response to the speed at which the electrode advances toward the workpiece so that a change in speed of the wire feed will change the movement of the operating point along the second segment accordingly, to maintain the end of the electrode within a region where it can be heated and melted.

5. A pulse welding machine power supply having an instantaneous operating point movable along a predetermined multi-segmented output characteristic, the operating point including an output voltage and output current detected across a consumable electrode wire as a first output terminal and a workpiece as a second output terminal, comprising:

first circuit means sor providing the power supply with a first output characteristic segemnt having a voltage component that is varying rapidly and an output current that is varying slightly as the operating point moves along the first segment between a first and second fixed operating points, the first segment being adapted for maintaining a background output current;

second circuit means for providing the power supply with a second output characteristic segment having a substantially constant output current and a varying output voltage as the operating point moves along the second segment between a third and fourth fixed operating points, the second segment being adapted for maintaining a pulse output current; and third circuit means for providing the power supply with a third output characterisitic segment of variable slope having an output voltage that is varying and an output current that is varying rapidly as the operating point moves along the third segment between a fifth and sixth operating points, the fifth operating point being located on the first segment and the sixth operating point being located on the second segment, the first, second, and third segments being a part of the multi-segmented output charactistic, the third segment being adapted for switching the output current between the background and pulse currents.

6. The apparatus of claim 5 further comprising fourth circuit means for connecting the first, second, and third output characteristic segments together so that as the instantaneous operating point moves from the first to the second segment, the second fixed operating point substantially overlaps the fifth operating point and the sixth operating point substantially over laps an operating point on the second segment, and so that as the instantaneous operating point moves from the second to the first segment, the sixth operating point substantially overlaps the third fixed operating point and the fifth operating point subtantially overlaps an operating point on the first segment.

7. The apparatus of claim 6 wherein the first circuit means further comprises:

a first diode having a conducting condition and a substantially non-conducting condition;

a first amplifier having as its inputs the sum of signals corresponding to the operating voltage, the operating current, and a first reference signal, the first reference signal being associated with the second fixed operating point; and means for connecting the first diode and first amplifier together so that the first diode is in a conducting condition when the first amplifier has one of a positive or negative output signal and a non-conducting condition when the first amplifier has the other of a positive or negative output signal, the output of the first diode being the first output characteristic segment and the operating point being on the first output characteristic segment when the first diode is conducting.

8. The apparatus of claim 6 wherein the second circuit means further comprises:

a second diode having a conducting and a substantially non-conducting condition;

a second amplifier having as its inputs the sum of signals corresponding to the operating current and a second reference signal, the second reference signal being associated with the third fixed operating point;

a third diode having a conducting and a substantially non-conducting condition; and means for connecting the second amplifier to the second diode and to the third diode sequentially so that the second diode is in a conducting condition and the third diode is in a non-conducting condition when the output of the second amplifier is one of a positive or negative output signal and so that the second diode is in a non-conducting condition and the third diode is in a conducting condition when the output of the second amplifier is the other of a positive or negative output signal, the output of the third diode being the second output characteristic segment and the operating point being on the second output characteristic segment when the second diode is conducting.

9. The apparatus of claim 6 wherein the third circuit means further comprises:

a fourth diode having a conducting condition and a substantially non-conducting condition;

a fifth diode having a conducting condition and a substantially non-conducting condition;

a fourth amplifier having as its input the sum of signals corresponding to the operating voltage, a third reference signal, and the time derivative of the operating current, the third reference signal being associated with the second and third fixed operating points;

a fifth amplifier; and means for connecting in series the output of the fourth amplifier to the fourth diode, to the fifth amplifier, and to the fifth diode sequentially, so that when the output of the fourth amplifier is one of a positive or negative output signal the fourth diode is conducting and the output of the fifth amplifier is in one of a positive or negative signal and the fifth diode is conducting, and so that when the fourth amplifier is in the other of a positive or negative output signal the fourth diode is non-conducting and the fifth diode is non-conducting, the output of the fifth diode being the third output characteristic segment and the operating point being on the third output characteristic segment when the fifth diode is conducting, the output of the conducting fifth diode having a substantially constant maximum value.

10. The apparatus of claim 9 wherein the pulse welding machine power supply is associated with an apparatus for advancing the electrode wire and the third reference signal further comprises a reference signal corresponding to the rate of speed of the electrode wire feed.

11. The apparatus of claim 6 wherein the distance between the electrode wire and the workpiece is determined as a function of the change in operating output voltage and current as the distance between the electrode wire and workpiece changes under operating conditions and wherein the first circuit means further comprises a fourth reference signal to establish the second fixed operating point of the first output characteristic segment, the fourth reference signal corresponding to a first selected distance between the electrode wire and the workpiece, and wherein the second circuit means further comprises a fifth reference signal to establish the third fixed operating point of the second output characteristic segment, the fifth reference signal corresponding to a second distance between the electrode wire and the workpiece, the second distance being greater than the first distance, the distances being selected for maintaining stable output current and stable spray metal transfer between the electrode wire and the workpiece.

12. The apparatus of claim 11 further comprising:
fifth circuit means for maintaining the instantaneous operating point on the first output characteristic segment when the distance between the electrode wire and the workpiece is greater than the first distance and for maintaining the instantaneous operating point on the second output characteristic segment when the distance between the electrode wire and the workpiece is less than the second distance; and
sixth circuit means for rapidly moving the operating point between the first and second segments along the third segment in response to the instantaneous operating point and the fourth and fifth reference signals, the operating point moving from the first to the second segment when the distance between the electrode wire and the workpiece becomes smaller than the first distance, the operating point moving from the second to the first segment when the distance between the electrode wire and the workpiece becomes greater than the second distance.

13. The apparatus of claim 12 wherein the sixth circuit means further comprises a reference signal corresponding to the rate of change of the operating current as the instantaneous operating point moves along the third segment, the rate of change being the first time derivative and causing the variable slope of the third segment.

14. The apparatus of claim 13 wherein the electrode wire is advanced at a rate of feed and the third circuit means further comprises a seventh circuit means for detecting the rate of feed of the electrode wire and providing a reference signal that varies directly with changes in the rate of feed so that the speed at which the operating point moves along the third output characteristic segment is directly affected by any change in the rate of feed of the electrode wire.

15. The apparatus of claim 11 wherein the multi-segmented output characteristic further comprises a plurality of circuit means for generating a corresponding plurality of output characteristic segments substantially interconnected together including more than one segment having variable slope for transfering the operating point between two segments of substantially fixed position, so as to provide a single power supply with more than one stable output current and stable spray metal transfer welding condition.

16. A method of arc welding using a power supply having an output voltage and an output current including a background current operating characteristic segment and a pulse current operating characteristic segment, connected to an advancing electrode wire and a workpiece separated by a varying arc length and generating an arc voltage and an arc current, comprising:
sensing the output voltage and current of the power supply;
comparing the output voltage and current to a first reference signal when the output of the power supply is on the background segment;
switching the output of the power supply from the background current segment to the pulse current segment when the output voltage and current is less than the first reference signal;
comparing the output voltage and current to a second reference signal when the output of the power supply is on the pulse current segment;
switching the output of the power supply from the pulse current segment to the background current segment when the output voltage and current is greater than the second reference signal;
heating the electrode wire in preparation for spray metal transfer when the output of the power supply is on the background current segment; and
melting the electrode wire causing spray metal transfer of molten electrode wire to the workpiece when the output of the power supply is on the pulse current segment;
switching of the output of the power supply between the background and pulse current segments occuring in response to the differential of the output current with respect to time and the change in output voltage as compared to a third reference signal which includes the rate of electrode wire feed advance so that the greater the differential and the difference between the output voltage and the third reference signal, the faster the switching occurs.

* * * * *